United States Patent [19]

Nakamura

[11] Patent Number: 5,280,589
[45] Date of Patent: Jan. 18, 1994

[54] MEMORY ACCESS CONTROL SYSTEM FOR USE WITH A RELATIVELY SMALL SIZE DATA PROCESSING SYSTEM

[75] Inventor: Nobutaka Nakamura, Tokyo, Japan

[73] Assignee: Kabushiki Kaisha Toshiba, Kawasaki, Japan

[21] Appl. No.: 689,720

[22] Filed: Apr. 22, 1991

Related U.S. Application Data

[63] Continuation of Ser. No. 226,306, Jul. 28, 1988, abandoned.

Foreign Application Priority Data

Jul. 30, 1987 [JP] Japan .................. 62-190885

[51] Int. Cl.⁵ ........................... G06F 1/00
[52] U.S. Cl. .................. 395/325; 364/DIG. 1; 364/240; 364/240.2; 364/239
[58] Field of Search .......... 395/250, 325, 400, 425

[56] References Cited

U.S. PATENT DOCUMENTS

| | | | |
|---|---|---|---|
| 4,570,220 | 2/1986 | Tetrick et al. | 364/200 |
| 4,695,944 | 9/1987 | Zandveld et al. | 395/325 |
| 4,737,932 | 4/1988 | Baba | 395/325 |
| 4,860,198 | 8/1989 | Takenaka | 364/200 |
| 4,862,354 | 8/1989 | Fiacconi et al. | 395/200 |
| 4,864,496 | 9/1989 | Triolo et al. | 395/295 |
| 4,870,704 | 9/1989 | Matelan et al. | 395/800 |
| 5,088,028 | 2/1992 | Theus et al. | 395/325 |
| 5,109,521 | 4/1992 | Culley | 395/800 |
| 5,113,369 | 5/1992 | Kinoshita | 395/325 |
| 5,125,088 | 6/1992 | Culley | 395/500 |

OTHER PUBLICATIONS

IBM PC/AT Technical Reference P(1-6), System Board Block Diagram, etc., 1984.
INTEL iAPX286 Hardware Reference Manual, 1984.

*Primary Examiner*—Rebecca L. Rudolph
*Attorney, Agent, or Firm*—Finnegan, Henderson, Farabow, Garrett & Dunner

[57] ABSTRACT

A memory access control system is disclosed. In this system, a CPU, a low speed memory, a high speed memory and direct memory access controller (DMAC) are connected to a system bus. A high speed memory is connected through a local bus to the CPU. A control circuit is connected to the local bus, the system bus and the high speed memory. A bidirectional buffer is connected to the local and system buses. When the CPU accesses the high speed memory, the control circuit addresses the high speed memory and disables the buffer. As a result, data can directly be transferred between the CPU and the high speed memory. When the CPU accesses the low speed memory, the control circuit drives the system bus according to a protocol of the system bus, thereby to address the low speed memory and enables the buffer. As a result, data can be transferred between the CPU and the low speed memory, via a route of the local bus, the buffer and the system bus. When the DMAC accesses the high speed memory, the control circuit addresses the high speed memory and enables the buffer according to the system bus protocol. As a result, data can be transferred between the DMAC and the high speed memory, through a route of the local bus, the buffer, and the system bus. When the DMAC accesses the low speed memory, the control circuit disables the high speed memory and the buffer.

10 Claims, 3 Drawing Sheets

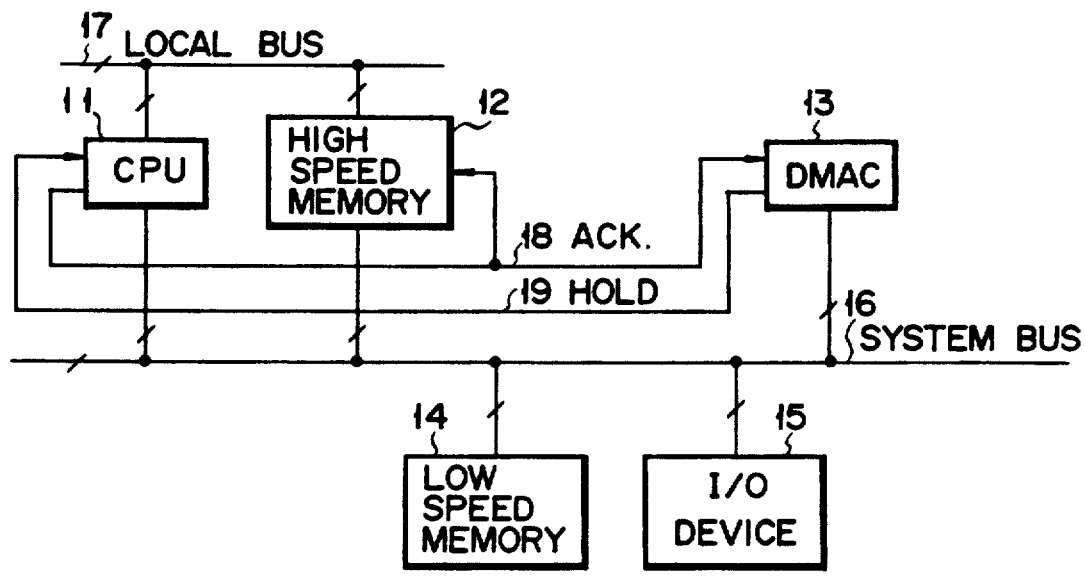
F I G. 3
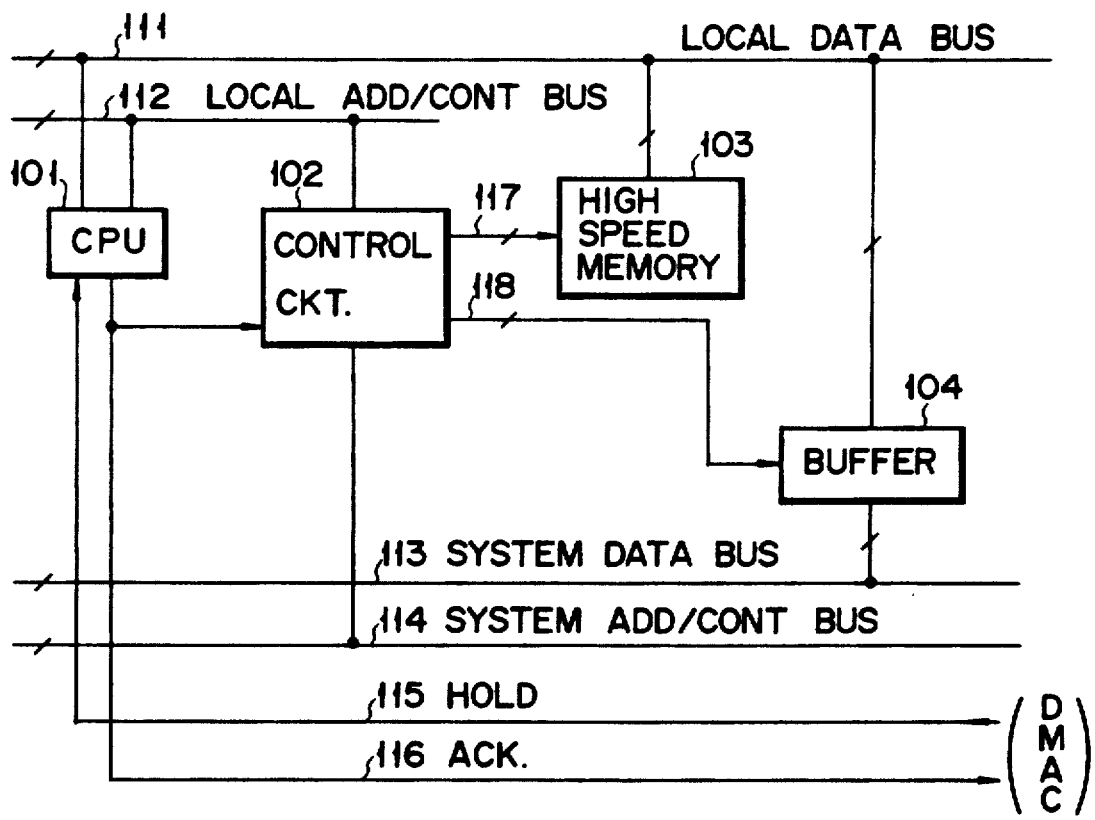
F I G. 4

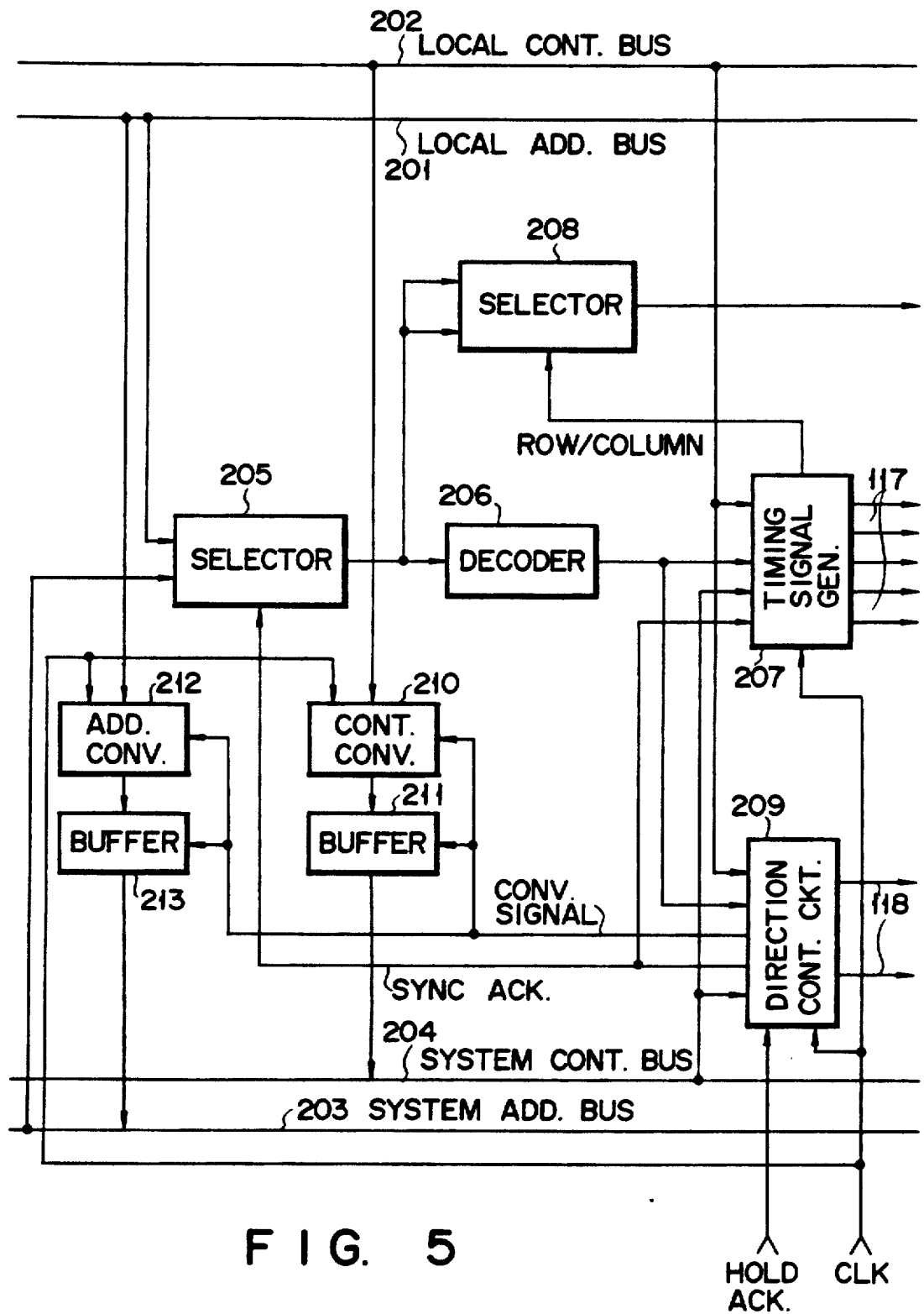
F I G. 5

MEMORY ACCESS CONTROL SYSTEM FOR USE WITH A RELATIVELY SMALL SIZE DATA PROCESSING SYSTEM

This application is a continuation, of application Ser. No. 07/226,306, filed Jul. 29, 1988 now abandoned.

BACKGROUND OF THE INVENTION

1. Field of the Invention

This invention relates to a relatively small size data processing system, and more particularly to a memory access control system in use with a relatively small size data processing system.

2. Description of the Related Fields

FIG. 1 shows a configuration of a relatively small size data processing system such as a personal computer. In the configuration of FIG. 1, memory 33 is connected to system bus 35. CPU 31 accesses to memory 33, via system bus 35. Such access system is called a system-bus memory access system.

There is another proposal of a memory access system in which CPU 41 accesses memory 42 through dedicated local bus 47, as shown in FIG. 2. This type of the access system can make a high speed access to memory 42, because there is no bothering of competitive acquisition of the bus line. The memory access system using the local bus is called a local-bus memory access system.

In the architecture of the data processing system configured as shown in FIG. 1, the memory access by CPU 31 and the memory access by direct memory access controller (DMAC) 32 are in the same level, with respect to system bus 35. Therefore, even if memory 33 per se is operable at a high speed, the control of system bus 35 limits increase of the access speed when high speed memory 33 is accessed.

In the data processing system configured as shown in FIG. 2, DMAC 43 is allowed to access only low speed memory 44 coupled with system bus 46. In other words, it cannot access high speed memory 42. DMAC 43 controls mainly the data transfer between low speed memory 44 and input/output (I/O) device 45. The access speed of DMAC 43 is limited by the operation speed of I/O device 45. Therefore, even if DMAC 43 accesses low speed memory 44, it does not damage an operation speed of the system in any way. Since high speed memory 42 is directly accessed by CPU 41, the performance of high speed memory 43 per se, and that of CPU 41 as well can be fully utilized.

As the result of recent rapid development of semiconductor technology, the operation speed of CPU and memory has been increased. With increase of the operation speed, disadvantages of the architecture of the system-bus memory access system have been more distinguished. A possible measure for this is to employ the architecture of the local-bus memory access system. However, this measure will encounter the problem inherent in this architecture that DMAC 43 cannot directly access high speed memory 42. A software approach may solve this problem. Specifically, a memory address space of CPU 41 is divided into an address space accessible by DMAC 43 and an address space inaccessible by the same. The software does not access to high speed memory 42.

The software approach, however, involves a problem "There is a danger that a software based on the system-bus system architecture does not run in the local-bus system architecture". In other words, the software based on the system-bus system architecture is not compatible with that based on the local-bus system architecture.

SUMMARY OF THE INVENTION

Accordingly, an object of this invention is to provide a data processing system which allows high speed CPU or high speed memory to fully exhibit its capabilities, while operating with a compatibility with the software based on the system-bus system architecture.

To achieve the above object, there is provided a data processing system having central processing unit (CPU) for processing data; first memory and second memory for storing data; memory access controller for controlling a memory access without control of the CPU, first bus for data transferring being connected to said CPU, said first and second memories and said memory access controller, and second bus for data transferring being connected to said CPU and said second memory; wherein said CPU accesses said first memory through said first bus, said CPU accesses said second memory through said second bus, said memory access controller accesses said first memory through said first bus, and said memory access controller accesses said second memory through said first bus.

With such an arrangement, the CPU and the memory access controller may freely access the first and second memories. Further, the CPU may access the second memory at a high speed via the second memory provided dedicatedly for it. Therefore, the memory and CPU constituting the system are operable while fully exhibiting their capabilities.

BRIEF DESCRIPTION OF THE DRAWINGS

FIG. 3 a block diagram showing a scheme of a data processing system according to an embodiment of this invention;

FIG. 4 shows a block diagram illustrating a more detailed configuration of the FIG. 3 data processing system; and FIG. 5 shows a block diagram illustrating a more detailed configuration of a CPU/memory control circuit used in the FIG. 4 circuit.

DETAILED DESCRIPTION OF A PREFERRED EMBODIMENT

Figure 1:
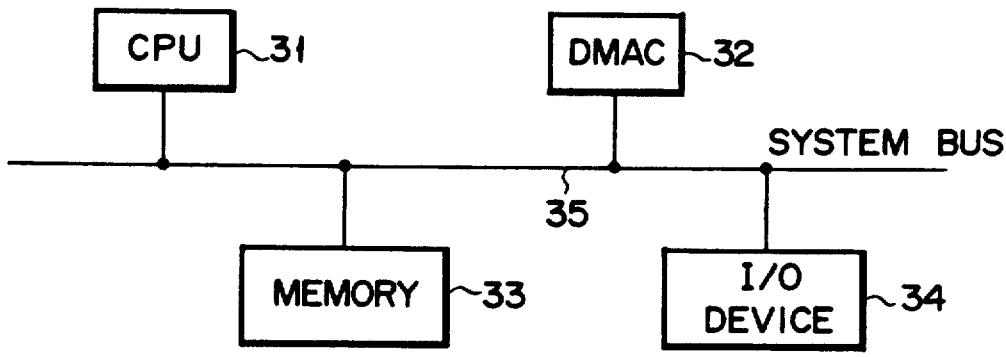
FIGS. 1 and 2 show block diagrams showing the schemes of data processing systems of prior arts, respectively.
Figure 2:
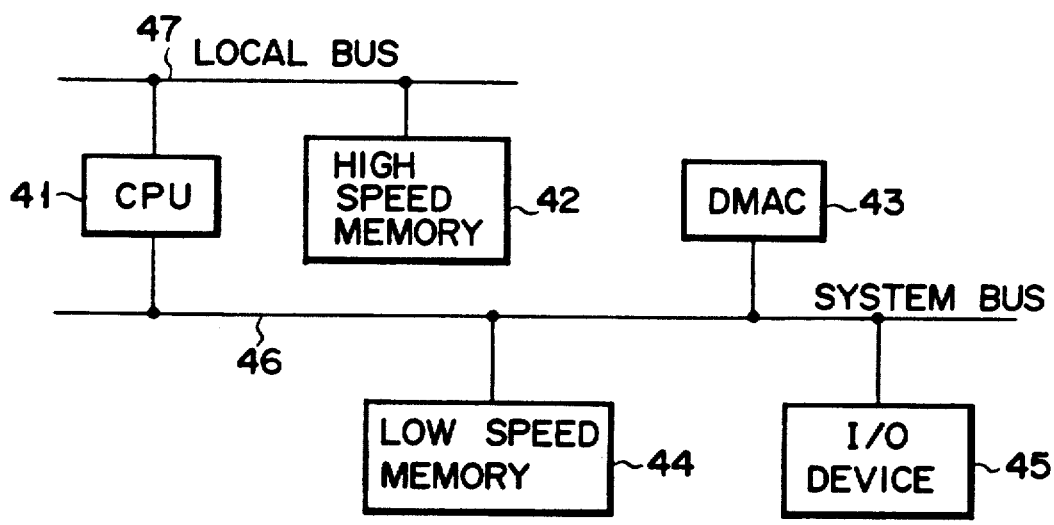

A preferred embodiment of a data processing system according to this invention will be described in detail referring to the accompanying drawings.

FIG. 3 shows in block form a configuration of a data processing system, which is one of preferred embodiments of this invention. A CPU including known peripheral circuits is represented by a single block denoted as 11. A high speed memory including known memory control circuitry is also represented by a single block denoted as 12. CPU 11 and high speed memory 12 are connected to system bus 16. As will be described later, CPU 11 never accesses to high speed memory 12 via system bus 16. System bus 16 is connected to direct memory access controller (DMAC) 13. It is also connected to low speed memory 14, which operates more slowly than high speed memory 12. System bus 16 is further coupled with input/output (I/O) devices such as a keyboard, a display, and an external memory device. DMAC 13 directly controls the data transfer among I/O device 15, low speed memory 14, and high speed memory 12 without any control of CPU 11.

A terminal for outputting a hold signal from DMAC 13 is connected through line 19 to the input port of CPU 11. An output port (terminal), for outputting an acknowledge signal, of CPU 11 is connected to a control signal input terminal of DMAC 13 via line 18. When DMAC 13 operates, it supplies a hold signal to CPU 11. CPU 11 returns a hold acknowledge signal to DMAC 13, and allows DMAC 13 to use system bus 16.

When DMAC 13 is operating, CPU 11 is in a hold state in response to the hold signal. In the hold state, CPU 11 suspends the use of both system bus 16 and local bus 17. The hold acknowledge signal is also supplied to high speed memory 12. In response to the hold acknowledge signal, high speed memory 12 knows that the present bus master is DMAC 13.

A more detailed depiction of the configuration including CPU 11, high speed memory 12, system bus 16, and local bus 17 in FIG. 3 is shown in FIG. 4.

In FIG. 4, the local bus consists of local data bus 111 and local address/control bus 112. The system bus consists of system data bus 113 and system address/control bus 114.

The data input/output port of CPU 101 is connected to local data bus 111. The address data output port and the control signal input/output port of CPU 101 are connected to local address/control bus 112.

The hold signal input port of CPU 101 is connected to the hold signal output terminal of DMAC 13 via line 115. The hold acknowledge signal output port of CPU 101 is connected through line 116 to the acknowledge signal input terminal of DMAC 13.

CPU/memory access control circuit 102 is connected to local address/control bus 112 and system address/control bus 114. Control circuit 102 receives at the control terminal a hold acknowledge signal derived from CPU 101. Control circuit 102 outputs address data and various control signals to high speed memory 103, through lines 117. When high speed memory 103 consists of a DRAM, for example, control circuit 102 supplies multiplexed address data, and control signals such as RAS (row address strobe), CAS (column address strobe), and WE (write enable).

Control circuit 102 supplies a signal representing enable/disable of buffer 104, and a signal for controlling the direction of signal flow to buffer 104. Lines 118 continuous to buffer 104 is used for these control signals transfer.

The data input/output terminals of high speed memory 103 are directly connected to local data bus 111. The data input/output terminals of high speed memory 103 are connected through buffer 104 to system data bus 113.

Buffer 104 is of the bidirectional type, and may be LS245, for example. A first group of terminals of buffer 104 is connected to local data bus 111, while the second group of terminals to system data bus 113.

The control circuit 102 is used for the following reasons. One reason is that it decides if the bus cycle of CPU 101 is a local bus cycle or a system bus cycle, and on the basis of the decision result, executes the control suitable for the bus cycle now used. The other reason is that it actually controls the access to high speed memory 103 by CPU 101 or DMAC 13.

Buffer 104 is provided for the following reasons. A first reason is that when CPU 101 uses system data bus 113, local data bus 111 is connected to system data bus 113. A second reason is that when DMAC 13 access high speed memory 103, system data bus 113 is connected to local data bus 111. In other modes of the data processing system, CPU 101 uses the system data bus and DMAC 13 accesses high speed memory 103, local data bus 111 is disconnected from system data bus 113. Local address/control bus 112 and system address/control bus 114 are always disconnected from each other.

An operation of the data processing system thus arranged will be described.

A brief description of the operation of the data processing system will first be given referring to FIG. 3.

The memory access by CPU 101 follows. CPU 11 accesses high speed memory 12 at a high speed, through local bus 17 or accesses low speed memory 14, input-/output device 15, and the like, through system bus 16.

The access by DMAC 13 follows. DMAC 13 outputs a hold signal to CPU 11. Upon receipt of this, CPU 11 returns a hold acknowledge signal to DMAC 13, to allow DMAC 13 to access the memory, and the like. DMAC 13 accesses low speed memory 14, for example, by using system bus 16 or accesses high speed memory 12 by using system bus 16. The memory access by DMAC 13 is performed under the protocol on system bus 16, regardless of the type of the accessed memory, high speed memory 12 or low speed memory 14. In handling the high and low speed memories, the difference is found in the memory addresses assigned to high speed memory 12 and low speed memory 14.

A detailed description of the operation of the data processing system will be given referring to FIG. 4.

(1) Access to High Speed Memory 103 by CPU 101

CPU 101 outputs to local address/control bus 112, a signal representing an address assigned to a desired memory area in high speed memory 103, and a control signal designating a read or write mode. Control circuit 102 detects the address signal on local address/control bus 112, and knows that CPU 101 is under access to high speed memory 103. Control circuit 102 outputs a control signal through line 118 to buffer 104. In turn, buffer 104 is disabled, viz., suspends its operation, so that local data bus 111 is electrically disconnected from system data bus 113. Under this condition, system address/control bus 114 is in a floating state. On the basis of the data on local address/control bus 112, control circuit 102 outputs address data, and control signals such as RAS, CAS and WE to high speed memory 103, via lines 117. As a result, in a write mode, the output data from CPU 101 is written into the desired or accessed memory area of high speed memory 103, through local data bus 111. In a read mode, data is read out from the accessed memory area of memory 103 via local data bus 111.

(2) Access to Low Speed Memory 14 or the Like by CPU 101

How CPU 101 accesses low speed memory 14, I/0 device 15, or the like will be described. To access low speed memory 14, for example, CPU 101 outputs to local address/control bus 112, an address signal, and a control signal designating a read mode or a write mode. Control circuit 102 detects the address/control data travelling on local address/control bus 112, and knows that CPU 101 is accessing low speed memory 14. Control circuit 102 applies a control signal via line 118 to buffer 104, which in turn is enabled. When CPU 101 desires a write mode, control circuit 102 directs buffer 104 to transfer the data on local data bus 111 to system data bus 113. In a read mode, control circuit 102 directs buffer 104 to transfer the data on system data bus 113 to local data bus 111. According to the address data and the control signal on local address/control bus 112, control circuit 102 drives system address/control bus 114 under the protocol of the system bus. In other words, control circuit 104 converts the format of the address data and the like on local address/control bus 112 into the format conforming to the system bus protocol. In a write mode, CPU 101 transfers the data to low speed memory 14 through local data bus 111, buffer 104 and system data bus 113. In a read mode, it receives the data from low speed memory 14, through system data bus 113, buffer 104 and local data bus 111.

During the access operation by CPU 101, control circuit 102 disables high speed memory 103 by a memory control signal on line 117, to prohibit the access to high speed memory 103.

(3) Access by DMAC 13

How DMAC 13 gains the right to access the memory, for example, will be discussed. To gain the access right, DMAC 13 sets a hold signal in an active level, and applies it to CPU 101, through line 115. In response to the hold signal, CPU 101 sets a hold acknowledge signal in an active level, and returns it to DMAC 13 through line 116. As a result, use of system buses 113 and 114 by DMAC 13 is permitted. In this case, CPU 101 also suspends use of local buses 111 and 112, in response to the hold signal from DMAC 13. Control circuit 102 detects the hold acknowledge signal on line 116 being in an active level, and knows that DMAC 13 will use the system buses.

(4) Access to Low Speed Memory 14 by DMAC 13

After gaining the right to access, DMAC 13 drives system address/control bus 114, thereby to transfer a signal representing the address in low speed memory 14 and a read/write designating signal therethrough. Control circuit 104 receives these signals and knows that the current access by DMAC 13 is not to high speed memory 103. Then, it applies a control signal through lines 117 to high speed memory 103, to disable this memory, and to retain the memory in an disabled state. Control circuit 102 also disables buffer 104, to disconnect system data bus 113 from local data bus 111. Under this condition, data transfer is performed between low speed memory 14 and I/0 device 15, through system bus 16, under the control of DMAC 13.

(5) Access to High Speed Memory 103 by DMAC 13

To make an access to high speed memory 103, DMAC 13 drives system address/control bus 114, to output an address signal of an accessed memory area of this memory. Control circuit 102 checks the address output, and knows that the access is now made to high speed memory 103. Then, it enables buffer 104 by a control signal output onto lines 118. As a result, system data bus 113 is connected to local data bus 111. DMAC 13 accesses high speed memory 103 at a relatively low speed by using system address/control bus 114. The access operation is performed under the protocol on system address/control bus 114. In turn, control circuit 102 addresses high speed memory 103 and supplies necessary control signals.

Subsequently, data is transferred between I/0 device 15 connected to system data bus 113 and high speed memory 103, through system data bus 113, buffer 104 and local data bus 111 under the control of DMAC 13. During the data transfer, CPU 101 leaves local data bus 111 released.

In the present embodiment, buffer 104, which connects and disconnects the local data bus to and from the system data bus, has two functions as mentioned above. The first is to form the route to allow use of the system data bus by CPU 101. The second is to form the route to allow access to the high speed memory by DMAC 13. If necessary, two buffers may be used for attaining those functions, respectively. This is true for the CPU/memory access control circuit designated by 102.

A detailed circuit arrangement of CPU/memory access control circuit 102 will be described with reference to FIG. 5.

As shown in FIG. 5, local address/control bus 112 includes local address bus 201 and local control bus 202. System address/control bus 114 includes system address bus 203 and system control bus 204.

Local address bus 201 and system address bus 203 are coupled with selector 205. An output signal (data) from selector 205 is supplied to address decoder 206. When an incoming address is the address assigned to one of the memory areas of high speed memory 103, address decoder 206 outputs a signal in an active level. The output signal of decoder 206 is supplied to timing signal generator 207. This generator 207 is connected to local control bus 202 and system control bus 204. Generator 207 supplies various types of control signals, such as RAS, CAS, WE, CPU READY, and DMA READY, to control terminals of high speed memory 103. The address data output from selector 205 is supplied to another selector 208. Selector 208 selects a row address or a column address from the received address data according to a ROW/COLUMN signal from timing signal generator 207.

A hold acknowledge signal is supplied to bus-direction control circuit 209. This circuit 209, which always receives a clock signal, outputs the synchronized hold acknowledge signal in synchronism with the clock signal.

Local control bus 202 and system control bus 204 are both connected to bus-direction control circuit 209.

Local control bus 202 is connected to control conversion circuit 210. The output signal of this conversion circuit 210 is supplied to control buffer 211. The output of control buffer 211 is coupled with system control bus 204. Bus-direction control circuit 209 supplies a conversion control signal to the control terminals of control conversion circuit 210 and control buffer 211.

Local address bus 201 is coupled with address conversion circuit 212. The output of this circuit 212 is coupled with address buffer 213. The output signal of address buffer 213 is supplied to system address bus 203. Bus-direction control circuit 209 supplies a conversion control signal to the control terminals of address conversion circuit 212 and address buffer 213.

Selector 205 and timing signal generator 207 are coupled for reception with the synchronized acknowledge signal.

The operation of CPU/memory access control circuit 102 will be described.

(1) Access to High Speed Memory 103 by CPU 101

In this operation mode, no hold acknowledge signal is produced. Under this condition, selector 205 selects local address bus 201. Address decoder 206 decodes the selected address, and knows that high speed memory 103 is now accessed, and produces a signal in an active level. This active level signal, nonactive synchronized hold acknowledge signal, and the control data on local control bus 202 are applied to generator 207, which in turn generates various control signals to make an access to high speed memory 103. In response to a ROW/-COLUMN signal applied, selector 208 successively selects and outputs a row address and a column address. Since the acknowledge signal is nonactive and the output signal from the address decoder 206 is active, bus-direction control circuit 209 disables buffer 104 to suspend its operation. Bus-direction control circuit 209 also controls the conversion control signal to disable conversion circuits 210 and 212 and buffers 211 and 213. By such operation of controller 102, CPU 101 can access high speed memory 103.

(2) Access to Low Speed Memory 14 by CPU 101

In this operation mode, no hold acknowledge signal is produced. Therefore, selector 201 selects local address bus 201. Address decoder 206 decodes the selected address, and knows that low speed memory 14 is currently accessed, and outputs a signal in a nonactive level. In response to this nonactive level signal, generator 207 disables high speed memory 103. When the control signal on local control bus 202 designates a write mode, bus-direction control circuit 209 controls buffer 104 so as to provide a signal route from local data bus 111 to system data bus 113. When the control signal designates a read mode, this circuit 209 controls the same so as to provide a signal route from system data bus 113 to local data bus 111.

Since the acknowledge signal and the output signal of address decoder 206 are now nonactive and active, respectively, bus-direction control circuit 209 renders the conversion control signal active, and enables conversion circuits 210 and 212, and buffers 211 and 213.

Control conversion circuit 210, which is supplied with a bus clock for the system bus, synchronizes the control data on local control bus 202 with the bus clock, and outputs the synchronized controlled data, finally to drive system control bus 202 through buffer 211. Similarly, address conversion circuit 212, which is supplied with a bus clock for the system bus, synchronizes the address data on local address bus 201 with the bus clock, and outputs the synchronized address data, finally to drive system address bus 203 through buffer 213. By such operation of controller 102, CPU 101 can access, for example, low speed memory 14.

(3) Access to High Speed Memory 103 by DMAC 13

Bus-direction control circuit 209 receives a hold acknowledge signal and outputs the synchronized hold acknowledge signal. Hence, selector 205 selects system address bus 203. Address decoder 206 receives selected address data, and detects the access to high speed memory 103, and outputs an active level signal. According to the synchronized acknowledge signal and this active level signal, generator 207 fetches the control signal on system control bus 204, outputs various control signals, and enables high speed memory 103.

Since the hold acknowledge signal and the output signal of address decoder 206 are now active, bus-direction control circuit 209 enables buffer 104. Further, the same controls the data flow direction of buffer 104 according to the control data on system control bus 204. By such operation of controller 102 DMAC 13 can access high speed memory 103.

(4) Access to Low Speed Memory 14 by DMAC 13

Bus-direction control circuit 209 receives a hold acknowledge signal and outputs the synchronized hold acknowledge signal. Hence, selector 205 selects system address bus 203. Address decoder 206 receives selected address data, and detects the access to low speed memory 14, and outputs a nonactive level signal. According to this nonactive level signal, generator 207 disables high speed memory 101. Since the acknowledge signal and the output signal of address decoder 206 are now active and nonactive, respectively, bus-direction control circuit 209 disables buffer 104. By such operation of controller 102, DMAC 13 can access low speed memory 14.

As seen from the foregoing description, a data processing system according to this invention has the following beneficial effects.

(1) To able to construct a data processing system making the best use of the high speed performance of CPU and the memory. The data processing system constructed is compatible in software with the system based on the system bus architecture.

(2) The design of a data processing system is relatively easy, because the bus arbitration based on the hold signal/acknowledge signal is employed.

(3) Known DRAMs may be used intact, because the DRAM makes an access to the high speed memory according to the system bus protocol. In this respect, the data processing system according to this invention has a hardware compatibility.

What is claimed is:

1. A data processing system having a single processor and compatible with a system-bus system, comprising:
   a local bus including a local address/control bus and a local data bus;
   a system bus including a system address/control bus and a system data bus;
   a high speed memory coupled to the local data bus;
   a low speed memory coupled to the system data bus;
   a direct memory access controller (DMAC) coupled to the system bus;
   a central processing unit (CPU) coupled to the local address/control bus and local data bus;
   an input/output device coupled to the system bus;
   gate means for selectively coupling the local data bus and the system data bus; and
   memory control means, directly connected to the high speed memory, the local address/control bus, and the system address/control bus, for detecting a device requesting a memory access and a data-transmission route, in response to the data on the system address/control bus and the local address/control bus, for supplying an address and address control signals to the high speed memory, thereby controlling and driving the high speed memory to transfer data via the local data bus when the CPU accesses the high speed memory, for supplying an address and address control signals to the high speed memory, thereby controlling and driving the high speed memory and the gate means to transfer data via the local data bus, the gate means, and the system data bus when the input/output device accesses the high speed memory by means of the DMAC and said local bus is coupled to said system bus through said gate means, and for controlling the gate means to coupled the local data bus and the system data bus when the CPU accesses the low speed memory.

2. The data processing system according to claim 1, wherein the gate means couples the local bus to the system bus when the device accesses the memory through the gate means and decouples the local bus from the system bus when the CPU accesses the memory.

3. The system according to claim 1, wherein said DMAC outputs a request signal to the CPU when requesting access to the memory, said CPU outputs an acknowledge (ACK) signal to the DMAC in response to the request signal, and said control means, in response to the ACK signal, detects that the input/output device is accessing the memory by means of the DMAC.

4. A data processing system having a single processor and compatible with a system-bus system, comprising:
   a local bus including a local address/control bus and a local data bus;
   a system bus including a system address/control bus and a system data bus whose bus cycle is lower than that of said local bus;
   a high speed memory coupled to the local data bus;
   a low speed memory coupled to the system bus;
   a device coupled to the system bus;
   a direct memory access controller (DMAC) coupled to the system bus;
   a central processing unit (CPU) coupled to the local bus;
   gate means for coupling the local data bus to the system data bus when the CPU accesses the low speed memory or the device accesses the high speed memory by means of the DMAC and for decoupling the local data bus from the system data bus when the CPU accesses the high speed memory or the device accesses the low speed memory by means of the DMAC; and
   memory control means, connected to the high speed memory, the local address/control bus, and the system address/control bus, for detecting a memory to be accessed and a device requesting memory access and a data-transmission route, in response to data on the system address/control bus and the local address/control bus, for suppling an address and address control signals to the high speed memory, thereby controlling the high speed memory to transfer data via the local data bus when the CPU accesses the high speed memory, for supplying an address and address control signals to the high speed memory, thereby controlling the high speed memory to transfer data via the local bus, the gate means, and the system bus when the device accesses the high speed memory through the gate means by means of the DMAC and said local data bus is coupled to said system data bus through said gate means, for synchronizing the control and address data on the local address/control bus of the system bus, for transmitting the synchronized control and address data to the system address/control bus, and for connecting the local data bus and the system data bus through said gate means when the CPU accesses the low speed memory.

5. The system according to claim 4, wherein said DMAC outputs a request signal to the CPU when requesting access to the memory, said CPU outputs an acknowledge (ACK) signal to the DMAC in response to the request signal, and said control means, in response to the ACK signal, detects that the input/output device is accessing the memory by means of the DMAC.

6. A data processing system having a single processor and a compatibility with a single bus system, comprising:
   a first bus including a first address/control bus and a first data bus;
   a second bus including a second address/control bus and a second data bus;
   a first memory coupled to the first data bus;
   a second memory coupled to the second data bus;
   a device coupled to the second bus;
   a central processing unit (CPU) coupled to the first bus;
   gate means for selectively coupling the first data bus and the second data bus; and
   control means, directly coupled to the first memory, the first address/control bus, and the second address/control bus, for supplying an address and address control signals to the first memory, thereby driving the first memory to transfer data via the first data bus when the CPU accesses the first memory, and for supplying an address and address control signals to the first memory, thereby controlling the first memory and gate means to transfer data via the first bus, the gate means, and the second bus and to connect said first bus to said second bus through said gate means when the device accesses the first memory, and for synchronizing the control and address data on the first address/control bus with a bus clock of the second bus, transmitting the synchronized control and address data to the second address/control bus, and connecting the first data bus to the second data bus through said gate means when the CPU accesses the second memory.

7. A data processing system according to claim 6, further comprising a direct memory access controller (DMAC) coupled to the second bud, and wherein said DMAC outputs a request signal to the CPU when requesting access to the first memory, said CPU outputs an acknowledge (ACK) signal to the DMAC in response to the request signal, and said control means, in response to the ACK signal, detects that the input/output device is accessing the first memory by means of the DMAC.

8. A data processing system, comprising:
   first bus means for transferring signals including first address/control bus means for transferring address/control signals and first data bus means for transferring data signals;
   second bus means for transferring signals including second address/control bus means for transmitting address/control signals and second data bus means for transmitting data signals;
   first memory means, coupled to the first data bus means, for storing data;
   second memory means, coupled to the second data bus means, for storing data;
   processing means, coupled to the first bus means, for accessing the first memory means;
   input/output means coupled to the second bus means for accessing the first memory means;
   gate means for selectively coupling the first data bus means and the second data bus means; and
   control means, directly coupled to the first memory means, the first address/control bus means, and the second address/control bus means, in response to signals on the first and second address/control bus means, for supplying an address and address control signals to the first memory means, thereby controlling the first memory means to transfer data via the first data bus means when the processing means accesses the first memory means, for supplying an address and address control signals to the first memory means, thereby controlling the first memory means and gate means to transfer data via the first bus means, the gate means, and the second bus means, and for connecting said first bus means to said second bus means through said gate means when the input/output means accesses the first memory means, and for synchronizing the address and control signals on the first address/control bus means with a bus cycle of the second address control means, transmitting the synchronized address and control signals to the second address/control bus means, and connecting the first data bus means to the second data bus means through said gate means when the processing means accesses the second memory means.

9. A single processor data processing system compatible with a single-CPU system-bus system, comprising:
  a first bus including a first address/control bus and a first data bus;
  a second bus including a second address/control bus and a second data bus;
  a first memory coupled to the first data bus;
  a second memory coupled to the second data bus;
  a device coupled to the second bus;
  a central processing unit (CPU) coupled to the first bus;
  gate means for coupling the first data bus to the second data bus when the CPU accesses the second memory or the device accesses the first memory and for decoupling the first data bus from the second data bus when the CPU accesses the first memory or the device accesses the second memory; and
  control means, coupled to the first memory, the first address/control bus, and the second address/control bus, for detecting memory to be accessed and a device requesting memory access in response to data on the first and second address/control buses, for controlling the first memory to transfer data via the first data bus when the CPU accesses the first memory, and the second bus when the device accesses the first memory, and for synchronizing data on the first address/control bus with a bus cycle of the second bus and transmitting the synchronized data to the second address/control bus.

10. A single-CPU data processing system compatible with a single-CPU system-bus system, comprising:
  first bus means for transmitting data including first address/control bus means for transmitting address and control signals, and first data bus means for transmitting data;
  second bus means for transmitting data including second address/control bus means for transmitting address and control signals, and second data bus means for transmitting data;
  firsts memory means, coupled to the first data bus means, for storing data;
  second memory means, coupled to the second bus means, for storing data;
  first access means, coupled to the first bus means, for accessing the first and second memory means;
  second access means, coupled to the second bus means, for accessing the first and second memory means;
  gate means for coupling the first data bus means to the second data bus means when the first access means accesses the second memory means or the second access means accesses the first memory means and for decoupling the first data bus means from the second data bus means when the first access means accesses the first memory means or the second access means accesses the second memory means; and
  control means, coupled to the first memory means, the first address/control bus means, and the second address/control bus means, for controlling the first memory means to transfer data via the first data bus means when the first access means accesses the first memory means, for controlling the first memory means to transfer data via the first bus means, the gate means, and the second bus means when the second access means accesses the first memory means, and for synchronizing the data on the first address/control bus with a bus clock of the second bus and transmitting the synchronized data to the second address/control bus means, when the first access means accesses the second memory means.

* * * * *

UNITED STATES PATENT AND TRADEMARK OFFICE
CERTIFICATE OF CORRECTION

PATENT NO. : 5,280,589
DATED : January 18, 1994
INVENTOR(S) : Nobutaka Nakamura

Page 1 of 2

It is certified that error appears in the above-indentified patent and that said Letters Patent is hereby corrected as shown below:

Abstract, line 16, chang "enables" to --enable--.

Related U.S. Application Data, Front Page, line 1, change "Jul. 28" to --Jul. 29--.

Claim 1, column 8, line 60, change "coupled" to --couple--.

Claim 4, column 9, line 37, change "suppling" to --supplying--.

UNITED STATES PATENT AND TRADEMARK OFFICE
CERTIFICATE OF CORRECTION

PATENT NO. : 5,280,589
DATED : January 18, 1994
INVENTOR(S) : Nobutaka Nakamura

It is certified that error appears in the above-indentified patent and that said Letters Patent is hereby corrected as shown below:

Claim 7, column 10, line 31, change "bud" to --bus--.

Claim 9, column 11, line 22, after "second" to delete --data--.

Claim 9, column 11, line 39, after "memory," insert --for controlling the first memory to transfer data via the first bus, the gate means,--.

Signed and Sealed this

Tenth Day of January, 1995

BRUCE LEHMAN

*Attest:*

*Attesting Officer*   *Commissioner of Patents and Trademarks*